US009740046B2

(12) United States Patent
Wyatt

(10) Patent No.: US 9,740,046 B2
(45) Date of Patent: Aug. 22, 2017

(54) METHOD AND APPARATUS TO PROVIDE A LOWER POWER USER INTERFACE ON AN LCD PANEL THROUGH LOCALIZED BACKLIGHT CONTROL

(71) Applicant: NVIDIA Corporation, Santa Clara, CA (US)

(72) Inventor: David Wyatt, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 53 days.

(21) Appl. No.: 14/149,636

(22) Filed: Jan. 7, 2014

(65) Prior Publication Data

US 2015/0130850 A1   May 14, 2015

Related U.S. Application Data

(60) Provisional application No. 61/903,329, filed on Nov. 12, 2013.

(51) Int. Cl.
*G09G 5/10* (2006.01)
*G02F 1/1335* (2006.01)
(Continued)

(52) U.S. Cl.
CPC ....... *G02F 1/133603* (2013.01); *G09G 3/342* (2013.01); *G09G 3/3611* (2013.01);
(Continued)

(58) Field of Classification Search
CPC ....... G09G 2320/0646; G09G 2360/08; G09G 3/3406; G09G 3/36; G09G 2330/021;
(Continued)

(56) References Cited

U.S. PATENT DOCUMENTS 6,813,041 B1 * 11/2004 Moroney .................. G06T 5/20
  358/1.9
6,961,066 B2 * 11/2005 James ..................... G06T 5/009
  345/426
(Continued)

FOREIGN PATENT DOCUMENTS

JP    2008197406 A  *  8/2008

OTHER PUBLICATIONS

U.S. Appl. No. 13/857,061, filed Apr. 4, 2013.
U.S. Appl. No. 13/857,079, filed Apr. 4, 2013.
U.S. Appl. No. 13/857,090, filed Apr. 4, 2013.

*Primary Examiner* — Michael J Jansen, II
(74) *Attorney, Agent, or Firm* — Zilka-Kotab, PC

(57) ABSTRACT

A system and method are provided for displaying a lower power user interface on an liquid crystal display (LCD) panel using localized backlight control. The method includes the step of identifying a subset of light emitting elements included in a backlight for the LCD panel, where the backlight includes a plurality of light emitting elements. The subset of light emitting elements consumes less power when operated individually or in combination with other subsets of light emitting elements than the total backlight with all light emitting elements simultaneously active. The method also includes the steps of activating the subset of light emitting elements to at least partially illuminate the LCD panel while at least one light emitting element is not activated, adjusting an image for a user interface based on a compensation map corresponding to the subset of light emitting elements, and displaying the adjusted image on the LCD panel.

20 Claims, 11 Drawing Sheets

(51) Int. Cl.
*G09G 3/34* (2006.01)
*G09G 3/36* (2006.01)

(52) U.S. Cl.
CPC .............. *G09G 2320/0646* (2013.01); *G09G 2320/0686* (2013.01); *G09G 2330/021* (2013.01); *G09G 2360/16* (2013.01)

(58) Field of Classification Search
CPC ....... G09G 2360/16; G09G 2320/0686; G09G 3/342; G09G 3/3611; G02F 1/133603
See application file for complete search history.

(56) References Cited

U.S. PATENT DOCUMENTS

| | | | | |
|---|---|---|---|---|
| 7,154,487 B2* | 12/2006 | Gu | ............................ | G09G 5/06 345/204 |
| 7,415,176 B2* | 8/2008 | Robinson | .................. | G01J 1/04 349/62 |
| 7,445,367 B2* | 11/2008 | Robinson | .................. | G01J 1/04 362/606 |
| 7,511,435 B2* | 3/2009 | Ye | ...................... | H05B 33/0815 315/224 |
| 7,521,879 B2* | 4/2009 | Hong | ................. | H05B 33/0815 315/216 |
| 7,581,837 B2* | 9/2009 | Whitehead | ............. | G03B 21/60 315/307 |
| 7,614,011 B2* | 11/2009 | Karidis | ................. | G06F 1/3203 345/212 |
| 7,768,496 B2* | 8/2010 | Daly | .................... | G09G 3/3406 345/102 |
| 7,961,199 B2* | 6/2011 | Kerofsky | ................. | G09G 3/22 345/426 |
| 8,089,451 B2* | 1/2012 | Furuta | .................... | G02B 6/002 345/102 |
| 8,446,398 B2* | 5/2013 | Ferren et al. | ................. | 345/211 |
| 8,698,701 B2* | 4/2014 | Margulis | ................ | G03B 21/26 345/1.1 |
| 9,202,423 B2* | 12/2015 | Sun | ...................... | G09G 3/2044 |
| 9,275,571 B2* | 3/2016 | Purdy | .................. | G09G 3/3208 |
| 9,310,998 B2* | 4/2016 | Demiya | ............. | G06F 3/04883 |
| 2004/0113924 A1* | 6/2004 | Jeong | .................. | G09G 5/02 345/690 |
| 2004/0125112 A1* | 7/2004 | James | .................... | G06T 5/009 345/589 |
| 2005/0073446 A1* | 4/2005 | Lazaridis | ............. | G06F 3/0202 341/22 |
| 2005/0151717 A1* | 7/2005 | Seo | ...................... | G09G 3/3406 345/102 |
| 2005/0270763 A1* | 12/2005 | Koike et al. | ...................... | 362/34 |
| 2006/0012577 A1* | 1/2006 | Kyrola | .......................... | 345/173 |
| 2006/0087502 A1* | 4/2006 | Karidis | ................. | G06F 1/3203 345/211 |
| 2006/0119612 A1* | 6/2006 | Kerofsky | ................. | G09G 3/22 345/590 |
| 2006/0268180 A1* | 11/2006 | Chou | ..................... | G06T 5/009 348/673 |
| 2006/0274026 A1* | 12/2006 | Kerofsky | ................. | G09G 3/22 345/102 |
| 2007/0030695 A1* | 2/2007 | Moon | ............... | G02F 1/133606 362/613 |
| 2007/0046618 A1* | 3/2007 | Imai | ..................... | G06F 1/3265 345/102 |
| 2007/0092139 A1* | 4/2007 | Daly | .................... | G09G 3/3406 382/169 |
| 2007/0115440 A1* | 5/2007 | Wiklof | ............. | 353/69 |
| 2007/0145914 A1* | 6/2007 | Hong | ................. | H05B 33/0815 315/291 |
| 2007/0291507 A1* | 12/2007 | Robinson | .................. | G01J 1/04 362/606 |
| 2008/0001934 A1* | 1/2008 | Wyatt | .......................... | 345/204 |
| 2008/0049051 A1* | 2/2008 | Han et al. | ..................... | 345/690 |
| 2008/0074060 A1* | 3/2008 | Ye | ...................... | H05B 33/0815 315/307 |
| 2008/0203929 A1* | 8/2008 | Park | ....................... | H05B 33/086 315/158 |
| 2008/0278412 A1* | 11/2008 | Kao | ..................... | G09G 3/2803 345/60 |
| 2008/0297497 A1* | 12/2008 | Lu | ........................ | G09G 3/3648 345/208 |
| 2010/0053133 A1* | 3/2010 | Furuta | .................... | G02B 6/002 345/207 |
| 2010/0066752 A1* | 3/2010 | Watanuki | ..................... | 345/589 |
| 2010/0134039 A1* | 6/2010 | Yu | ........................ | G09G 3/3426 315/291 |
| 2010/0201275 A1* | 8/2010 | Cok | ...................... | G06F 3/0412 315/158 |
| 2010/0283938 A1* | 11/2010 | Chou | .................... | G09G 3/3406 349/61 |
| 2010/0283939 A1* | 11/2010 | Chou | .................... | G09G 3/3406 349/61 |
| 2010/0309109 A1* | 12/2010 | Won | ..................... | G09G 3/3426 345/102 |
| 2010/0317408 A1* | 12/2010 | Ferren et al. | .................. | 455/566 |
| 2011/0037576 A1* | 2/2011 | Jeon et al. | .................. | 340/407.2 |
| 2011/0090141 A1* | 4/2011 | Liao | ...................... | G02B 6/0068 345/102 |
| 2012/0001964 A1* | 1/2012 | Masuda | ............... | G09G 3/3413 345/690 |
| 2012/0127367 A1* | 5/2012 | Glen | .......................... | 348/571 |
| 2012/0327139 A1* | 12/2012 | Margulis | ................ | G03B 21/26 345/690 |
| 2012/0327303 A1* | 12/2012 | Sun | ...................... | G09G 3/3406 348/687 |
| 2013/0054997 A1 | 2/2013 | Wyatt et al. | | |
| 2013/0054998 A1 | 2/2013 | Wyatt et al. | | |
| 2014/0063209 A1* | 3/2014 | Watanabe et al. | .............. | 348/51 |
| 2014/0104326 A1* | 4/2014 | Roh | .................... | G09G 3/3208 345/691 |
| 2014/0111433 A1* | 4/2014 | Solomon | ............... | G06F 3/0346 345/158 |
| 2014/0184583 A1* | 7/2014 | Wyatt | .................. | G09G 3/3614 345/214 |
| 2014/0285535 A1* | 9/2014 | Pyo | ..................... | G09G 3/3291 345/690 |
| 2014/0300618 A1* | 10/2014 | Wyatt | ................. | G06T 5/009 345/589 |
| 2014/0300624 A1* | 10/2014 | Wyatt | ................. | G09G 3/342 345/600 |
| 2014/0301658 A1* | 10/2014 | Wyatt | ................. | G09G 3/342 382/254 |
| 2014/0347403 A1* | 11/2014 | Song | ................... | G09G 3/3258 345/690 |
| 2015/0010248 A1* | 1/2015 | Chuang | .................. | G06T 5/007 382/274 |

* cited by examiner

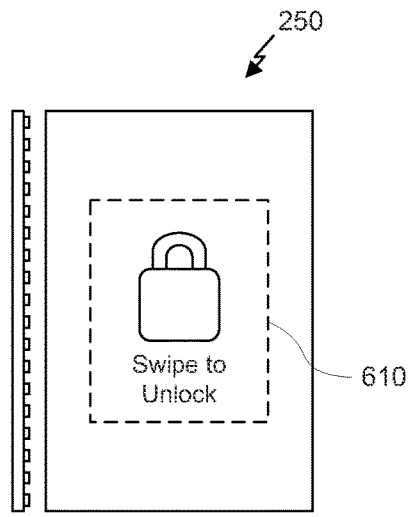
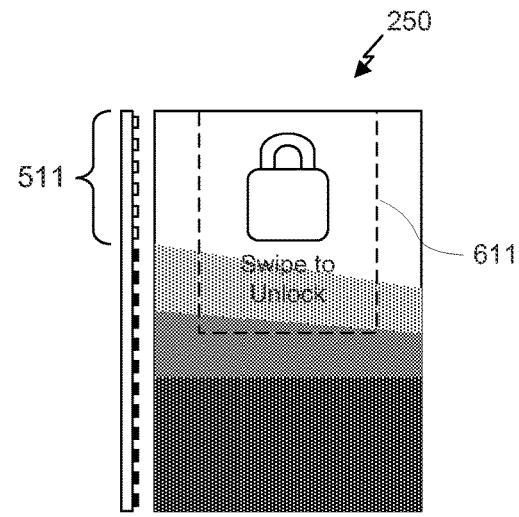
*Fig. 6A*  *Fig. 6B*
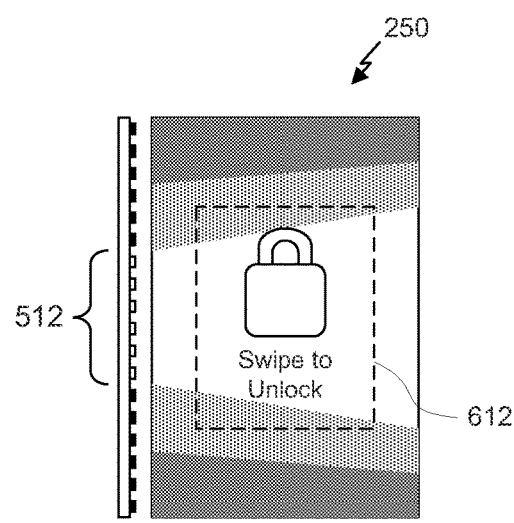
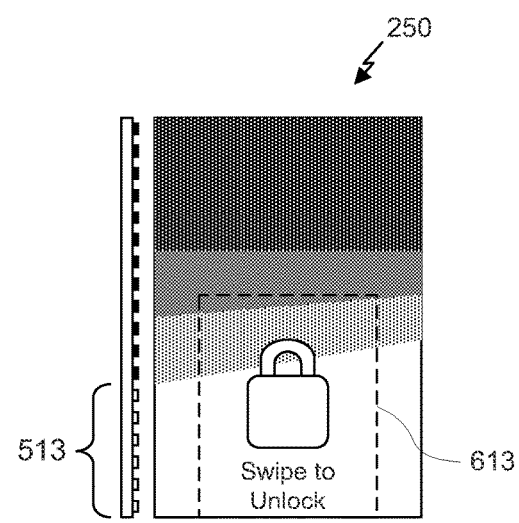
*Fig. 6C*  *Fig. 6D*

METHOD AND APPARATUS TO PROVIDE A LOWER POWER USER INTERFACE ON AN LCD PANEL THROUGH LOCALIZED BACKLIGHT CONTROL

CROSS-REFERENCE TO RELATED APPLICATION(S)

This application claims priority to U.S. Provisional Patent Application No. 61/903,329, filed on Nov. 12, 2013, which is hereby incorporated by reference in its entirety.

FIELD OF THE INVENTION

The present invention relates to LCD (Liquid Crystal Display) panels, and more particularly to low power operation of LCD panels through localized backlight control.

BACKGROUND

Many electronic devices include an LCD panel to display images to a user. The LCD panel may be used to display images, video, or a user interface for the device. A typical display device includes an LCD panel and a means for dispersing light through the pixels (e.g., a trio of liquid crystal elements associated with red, green, and blue color filters) of the LCD panel. The backlights used for generating the light dispersed through the pixels may be CFLs (Compact Fluorescent Lamps), LEDs (Light Emitting Diodes), or electroluminescent material. These backlights may be arranged at an edge of the LCD panel and the light may be dispersed through the pixels using a diffuser that spreads the light more evenly over the entire surface of the LCD panel. Alternately, the backlights may be arranged in a matrix directly behind the LCD panel.

Most of the power required to display images on the LCD panel is used for activating the backlight. Many conventional devices today are powered via batteries (i.e., cellular phones, tablet computers, etc.) that have a limited storage capacity. Thus, conserving power consumed by the display is important for extending the battery life of the device. One power saving technique utilized by today's high definition LCD televisions uses localized dimming to increase the contrast of displayed images (i.e., adjusting the backlight in specific regions of the LCD panel to lower the light dispersed through pixels associated with darker portions of an image). While this technique has proven useful when applied to video displayed on today's high end televisions, localized backlight control has not been implemented on smaller and cheaper LCD displays included in many of today's consumer electronic devices. Consumer electronic devices having displays with a backlight that is always activated consume more power that drains the battery of the device. Thus, there is a need for addressing these issues and/or other issues associated with the prior art.

SUMMARY

A system and method are provided for displaying a lower power user interface on an LCD panel using localized backlight control. The method includes the step of identifying a subset of light emitting elements included in a backlight for the LCD panel, where the backlight includes a plurality of light emitting elements. The method also includes the steps of activating the subset of light emitting elements to at least partially illuminate the LCD panel while at least one light emitting element is not activated, adjusting an image for a user interface based on a compensation map corresponding to the subset of light emitting elements, and displaying the adjusted image on the LCD panel.

BRIEF DESCRIPTION OF THE DRAWINGS

FIGS. 6A through 6D illustrate an image for a user interface displayed on the LCD panel under a low power configuration implemented with localized backlight control, in accordance with one embodiment;

DETAILED DESCRIPTION

A display may include an LCD panel that is illuminated by a backlight including a plurality of light emitting elements. Localized backlight control may be enabled to separately activate and deactivate different subsets of light emitting elements such that the backlight only illuminates a portion of the LCD panel. In a low power operating mode, an image associated with a user interface may be adjusted and displayed on a portion of the LCD panel that is at least partially illuminated such that the reproduced image viewed on the partially illuminated LCD panel substantially matches the intended image to be displayed.

Figure 1:
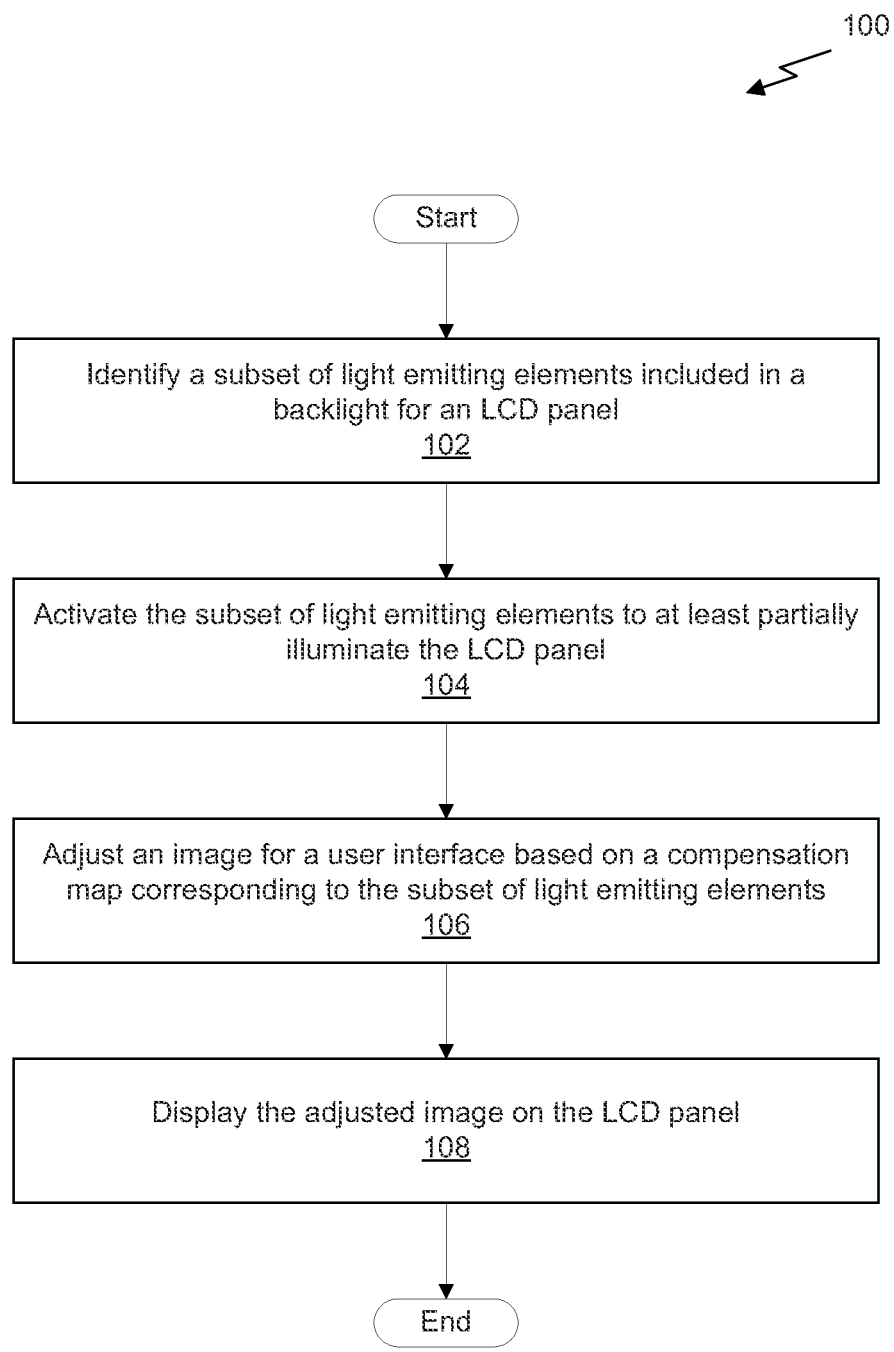
FIG. 1 illustrates a flowchart of a method for displaying a user interface on an LCD panel running in a low power mode of operation implemented via localized backlight control, in accordance with one embodiment.

FIG. 1 illustrates a flowchart of a method 100 for displaying a user interface on an LCD panel running in a low power mode of operation implemented via localized backlight control, in accordance with one embodiment. At step 102, a subset of light emitting elements included in a backlight for an LCD panel is identified. Identifying the subset of light emitting elements may be performed by selecting at least one light emitting element in the plurality of light emitting elements to activate. The subset of light emitting elements is less than all of the light emitting elements of the backlight such that the backlight is not fully turned on (i.e., activated). Thus, the entire surface of the LCD panel may not be fully illuminated as opposed to normal operation of the display (i.e., when power is not conserved).

In one embodiment, a backlight for the LCD panel includes a plurality of LEDs arranged on a bar at the edge of the LCD panel. The backlight may be positioned proximate to a diffuser that guides the light to be dispersed more evenly through the surface of the LCD panel. In another embodiment, the backlight for the LCD panel includes a plurality of CFLs arranged at the edge of the LCD panel. In yet another embodiment, the backlight may include an array of LEDs positioned directly behind the LCD panel. In still another embodiment, the backlight may comprise a number of sheets of electroluminescent material (i.e., a material that gives off light when the material is subjected to an electric current) arranged directly behind the LCD panel.

At step 104, the subset of light emitting elements is activated to at least partially illuminate the LCD panel while at least one light emitting element is not activated. In one embodiment, the plurality of light emitting elements is divided into a plurality of groups, each group including one or more light emitting elements. The groups may be configured such that each group substantially illuminates a portion (i.e., region) of the LCD panel while one or more other portions of the LCD panel are not fully illuminated. For example, a bar of LEDs arranged at the edge of the LCD panel may be divided into three groups of LEDS, with each group of LEDs being a contiguous set of LEDs on the bar. A first group is configured to at least partially illuminate a first portion of the LCD panel (e.g., a top third of the LCD panel), a second group is configured to at least partially illuminate a second portion of the LCD panel (e.g., a middle third of the LCD panel), and a third group is configured to at least partially illuminate a third portion of the LCD panel (e.g., a bottom third of the LCD panel). In one embodiment, only one group of the LEDs is activated at a time, illuminating approximately one third of the LCD panel.

At step 106, an image for a user interface is adjusted based on a compensation map corresponding to the subset of light emitting elements. The image may be a graphical representation of the user interface that is to be displayed by the LCD panel. The image may be defined as a plurality of pixel values (e.g., RGB values) for each of the pixels in the LCD panel. Alternatively, the image may be defined as a plurality of pixel values for each of the pixels in a portion of the LCD panel (i.e., the resolution of the image is less than the resolution of the LCD panel). The image may represent the state of the pixels associated with a fully illuminated backlight in order to accurately reproduce the image for a viewer. However, with only a subset of light emitting elements in the backlight activated in the low power mode of operation, the LCD panel may not be fully illuminated. Therefore, the image is adjusted to compensate for the partial illumination of some of the pixels intersected with the image when the image is displayed on the LCD panel.

In the context of the present description, a compensation map may refer to an array of values corresponding to a plurality of pixels in at least a portion of the LCD panel. The compensation map may include values that may be applied to the pixel values in the image such that a corresponding pixel in the LCD panel, when not fully illuminated, accurately reproduces the color of the image for that pixel. In one embodiment, the compensation map is generated by taking a measurement of the light dispersed through each pixel of the LCD panel when only the subset of light emitting elements is activated. At step 108, the adjusted image is displayed on the LCD panel.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
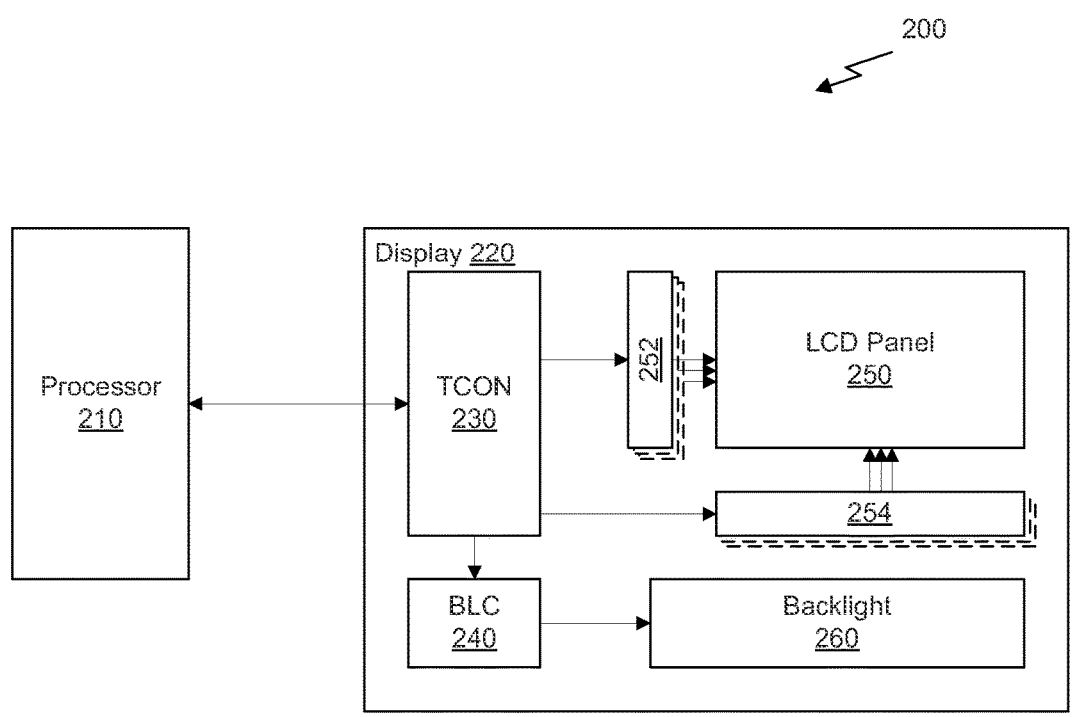
FIG. 2 illustrates a system including a display with a localized backlight control capability, in accordance with one embodiment.

FIG. 2 illustrates a system 200 including a display 220 with a localized backlight control capability, in accordance with one embodiment. As shown in FIG. 2, the display 220 includes a timing controller (TCON) 230, a backlight controller (BLC) 240, an LCD panel 250, and a backlight 260. The LCD panel 250 comprises a plurality of liquid crystal elements (i.e., a liquid crystal and integrated color filter. In one embodiment, each pixel of the LCD panel 250 includes a trio of liquid crystal elements with red, green, and blue color filters, respectively. The LCD panel 250 arranges these pixels in a two-dimensional (2D) array that can be controlled via the row drivers 252 and the column drivers 254 to update the image being displayed by the LCD panel 250. The TCON 230 drives the row drivers 252 and column drivers 254 to address specific pixels of the LCD panel 250 and adjust the voltage provided to the liquid crystal elements in the pixel to change the intensity of the light passing through each of the three liquid crystal elements and, therefore, the color of the pixel displayed on the surface of the LCD panel 250. The TCON 230 alternately addresses different pixels in the LCD panel 250 and updates each individual pixel in the LCD panel 250 once per refresh cycle.

The display 220 also includes a backlight 260 that includes a plurality of light emitting elements. In one embodiment, the light emitting elements are LEDs. The LEDs may be arranged at an edge of the LCD panel 250 and the light generated by the LEDs may be dispersed through the LCD panel 250 by a diffuser (not explicitly shown). Alternately, the LEDs may be arranged in a 2D array directly behind the LCD panel 250. This arrangement may be referred to as direct backlighting because each LED may disperse light through one or more corresponding pixels of the LCD panel 250 positioned in front of the LED.

In another embodiment, the light emitting elements may be CFLs. The CFLs are typically arranged along one or more edges of the LCD panel 250. In cases where multiple edges are illuminated, the combination of edges may be altered to effect selective illumination of a region wherein less than the total set of lighting elements is used with less power.

In yet another embodiment, the light emitting elements may be a sheet (or sheets) of electroluminescent material. The sheet of electroluminescent material may be placed behind the LCD panel 250 such that light from the surface of the electroluminescent material is dispersed through the pixels of the LCD panel 250. The sheet of electroluminescent material may be divided into a plurality of regions (e.g., the sheet may be divided into quadrants, each quadrant corresponding to a quadrant of the LCD panel 250). Each region may be individually controlled to illuminate only a portion of the LCD panel 250. It will be appreciated that the type of backlight 260 implemented in the system 200 is not limited to these particular lighting technologies and that any backlight 260 that can be divided into subsets of light emitting elements, each subset, when activated, capable of illuminating at least a portion of the LCD panel may be included in the system 200.

The backlight 260 is controlled by the BLC 240. The BLC 240 may include a driver that is configured to provide a voltage to the light emitting elements of the backlight 260. In one embodiment, the BLC 240 includes a pulse width modulation (PWM) driver that generates a PWM signal that activates (i.e., turns on) at least a portion of the light emitting elements of the backlight 260. The PWM signal may have a duty cycle and frequency that cause the light generated by the light emitting elements to be dimmed. A 0% duty cycle may correspond to the light emitting elements being fully off and a 100% duty cycle may correspond to the light emitting elements being fully on. Intermediate duty cycles (e.g., 50%, 75%) cause the light emitting elements to be turned on for a portion of a cycle period and then turned off for a portion of a cycle period. The cycle period is fast enough that the "blinking" of the light emitting elements is not noticeable and the effect to a user is that the level of the light emitted by the backlight 260 is lower than if the backlight 260 were fully activated. Although the BLC 240 is shown as an external component of the TCON 230, in one embodiment, the functionality of the BLC 240 may be included in the TCON 230.

The display 220 is connected to a processor 210 that generates images for display on the LCD panel 250. The processor 210 may implement an interface for communicating with the display such as, but not limited to, a Video Graphics Array (VGA) interface, a High-Definition Multimedia Interface (HMDI), a DisplayPort (DP) or embedded DisplayPort (eDP) interface, a Digital Visual Interface (DVI), and the like. In one embodiment, the processor 210 is a graphics processing unit (GPU) configured to process graphics data to generate images for display on the LCD panel 250. The GPU may be configured to implement an image processing pipeline that generates pixel data for display on the LCD panel 250. The image processing pipeline may correspond with a programmable image processing pipeline defined by the OpenGL® architecture. The GPU may also be connected to a host processor, such as a CPU, that executes a device driver configured to control the operation of the GPU.

Figure 3A:
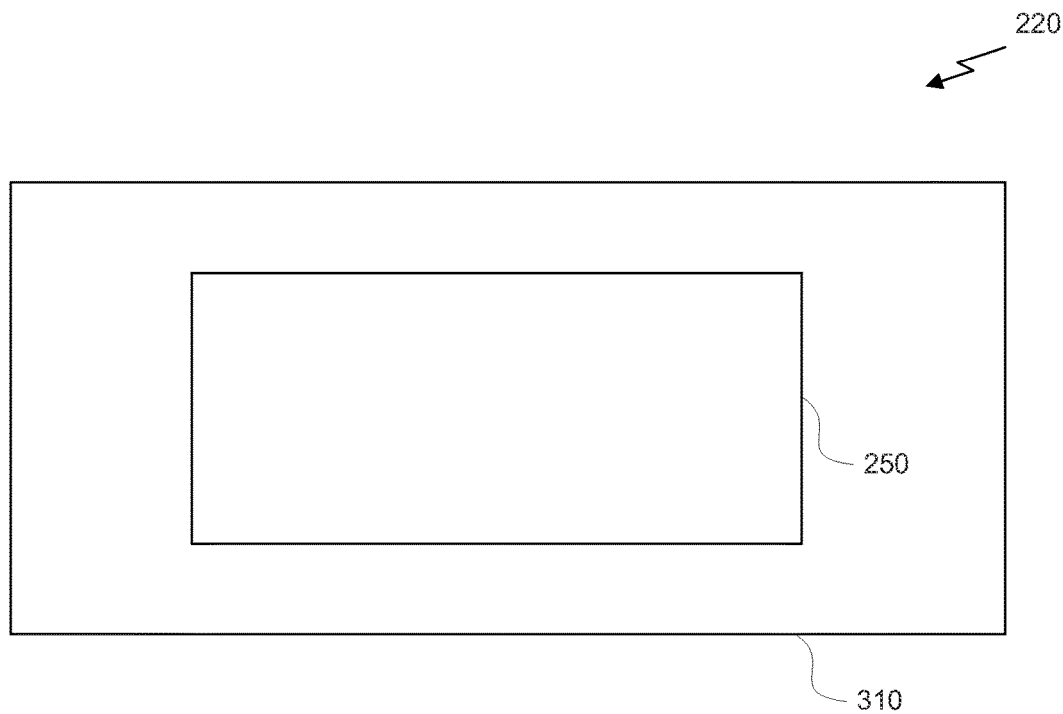
FIGS. 3A through 3C illustrate the structural components for the display, in accordance with one embodiment.
Figure 3B:
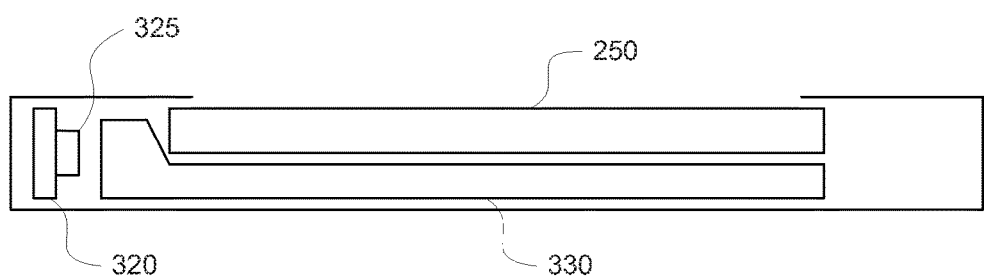
Figure 3C:
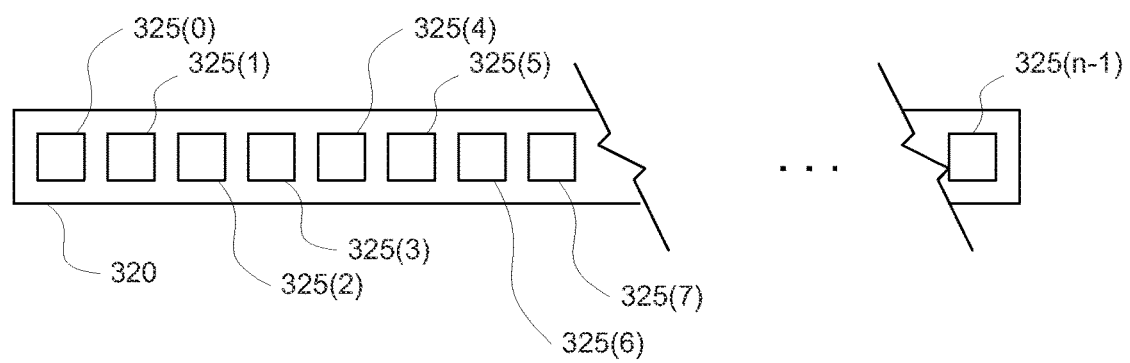

FIGS. 3A through 3C illustrate the structural components for the display 220, in accordance with one embodiment. As shown in FIG. 3A, a front surface of the display 220 includes a bezel 310 that surrounds the visible portion of the LCD panel 250. The bezel 310 may be a case or frame comprising a plastic or sheet metal material that encloses the components of the display 220. The bezel 310 may include cutouts for controls or buttons for providing input to the display 220. Alternately, the bezel 310 may include a touch sensitive portion for implementing the controls for providing input to the display 220. The controls may include a power button, a contrast adjustment, a brightness adjustment, a menu button, a volume adjustment, and the like. The bezel 310 may also include an identifying mark such as the name of the manufacturer of the display 220. In addition, an aperture may be formed in the bezel 310 that may be illuminated by the backlight 260. For example, a logo for a manufacturer of the display may be formed in the bezel 310 and illuminated when the backlight 260 is turned on.

As shown in FIG. 3B, a bottom-view cutaway of the display 220 illustrates the arrangement of at least some of the components of the display 220. For example, the LCD panel 250 is positioned in front of a diffuser 330. The diffuser may incorporate light guides and reflectors that direct light generated by a bar 320 of light emitting elements 325 positioned at the edge of the LCD panel 250. The function of the diffuser is to more evenly disperse light generated by the light emitting elements through the surface of the LCD panel 250 and redirect the light at a direction that is substantially normal to the surface of the LCD panel 250 such that the light passes through the liquid crystal elements in the LCD panel 250 to display an image to a viewer.

As shown in FIG. 3C, the bar 320 of light emitting elements 325 includes a plurality of light emitting elements arranged in a row. The row of light emitting elements 325 may extend along substantially the entire length of one or more edges of the LCD panel 250. In one embodiment, the bar 320 includes n LEDs arranged in a row of LEDs that is one LED wide by n LEDs long. Conventionally, the LEDs are driven by the BLC 240 by arranging the LEDs into groups of LEDs connected in series, where a PWM signal is transmitted to a driver (e.g., an op amp) that converts the signal to a voltage applied to each end of the group of LEDs. Because the voltage required to drive the group of LEDs is based on the threshold voltage to turn on a single LED multiplied by the number of LEDs in the group, the LEDs included in the bar 320 may be divided into a plurality of groups driven individually by distinct drivers such that the total voltage required to turn on the group of LEDs is limited. In such cases, every $m^{th}$ LED may be included in a particular group such that each group includes LEDs that are interspersed among the LEDs of the other groups. Thus, if one group of LEDs is defective, then the other groups of LEDs may still illuminate the screen substantially uniformly, just at a lower level of illumination.

As an example, a first group of LEDs may include a first LED 325(0), a second LED 325(3), a third LED 325(6), and so forth until a last LED 325($n-3$). A second group of LEDs may include a first LED 325(1), a second LED 325(4), a third LED 325(7), and so forth until a last LED 325($n-2$). A third group of LEDs may include a first LED 325(2), a second LED 325(5), a third LED 325(8), and so forth until a last LED 325($n-1$). Thus, each group of LEDs only includes a third of the total LEDs in the backlight and may activate LEDs along substantially the entire length of the bar 320. As described below, this conventional grouping of LEDs is not ideal for implementing localized backlight control that partially illuminates specific portions of the LCD panel.

Figure 4A:
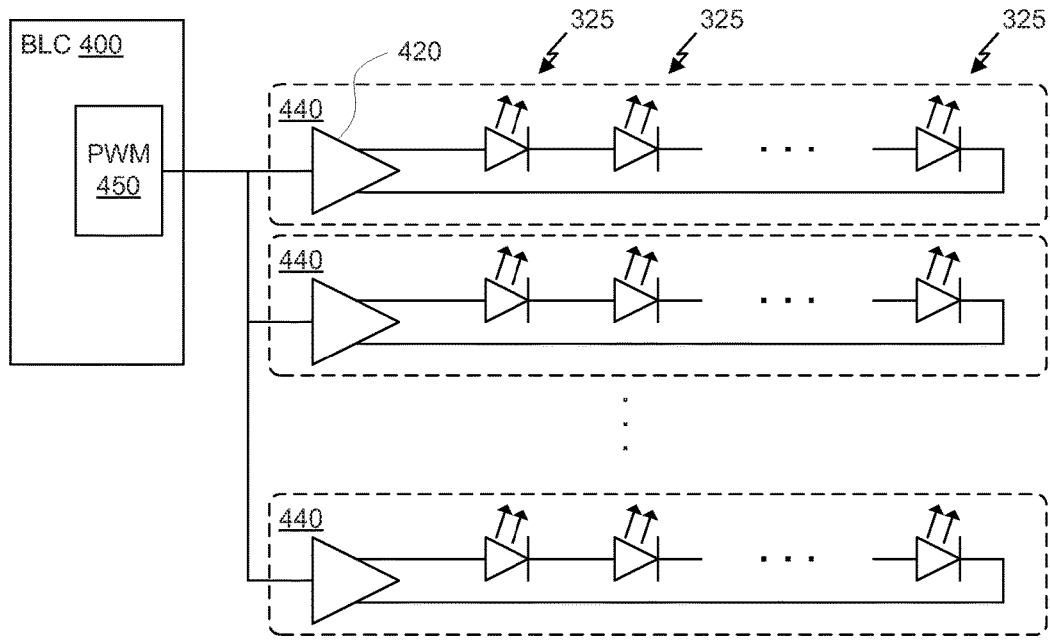
FIGS. 4A through 4C illustrate the electrical connection of the light emitting elements of the backlight, in accordance with various embodiments.
Figure 4B:
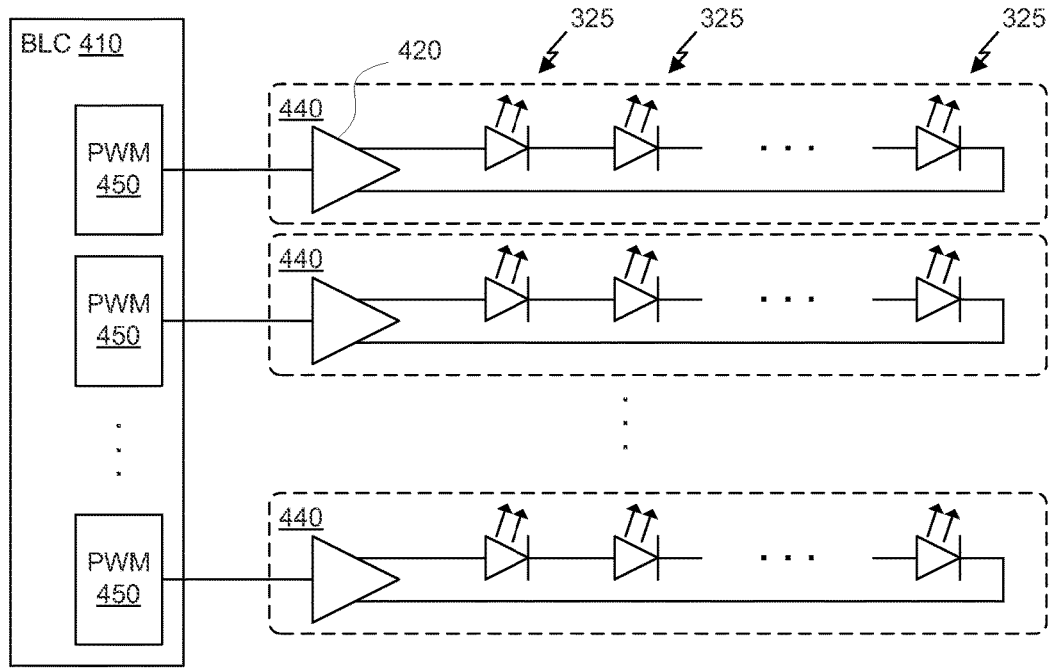
Figure 4C:
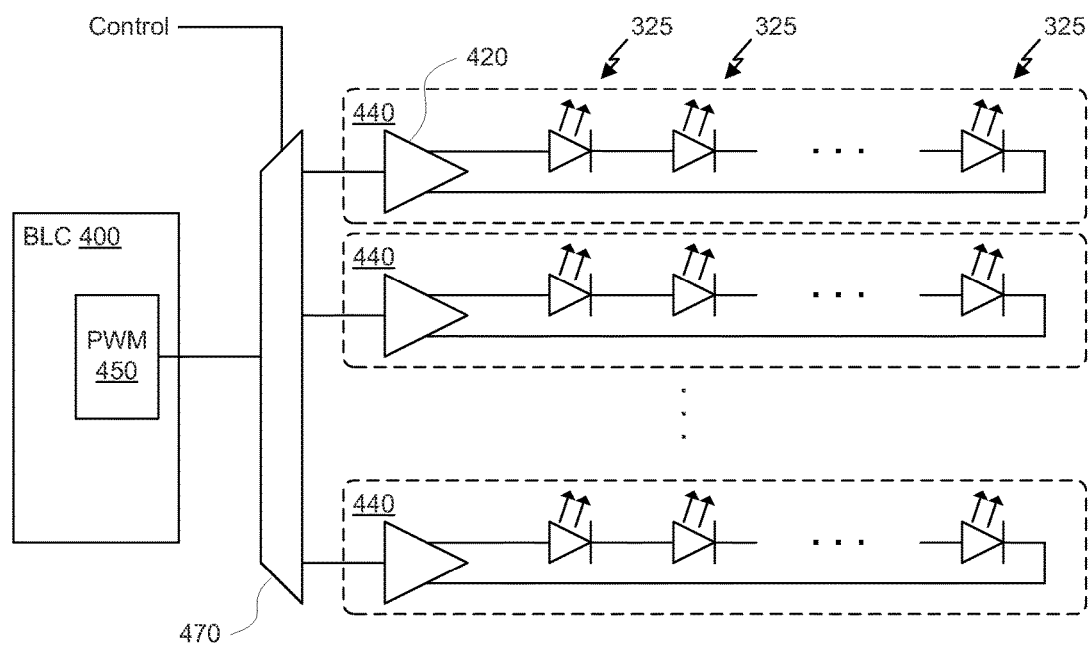

FIGS. 4A through 4C illustrate the electrical connection of the light emitting elements of the backlight 260, in accordance with various embodiments. In one embodiment, a BLC 400 includes a single PWM module 450. The PWM module 450 is configured to generate the PWM signal based on, e.g., a value in a register in the display 220 that may be set by the processor 210. Again, although the BLC 400 is shown as a distinct unit, in some embodiments, the functionality of the BLC 400 may be incorporated into the TCON 230.

As shown in FIG. 4A, the PWM signal is distributed to m groups 440 of LEDs 325. Each group 440 includes a driver 420 that receives the PWM signal and amplifies the signal to provide a differential output having a positive voltage and a negative voltage. In one embodiment, the positive voltage is a supply voltage for driving the light emitting elements and the negative voltage is a ground potential when the PWM signal is logically high, and the positive voltage and the negative voltage are a ground potential when the PWM signal is logically low. The driver 420 may be, e.g., an op amp or a power MOSFET configured to supply a current at a particular voltage to the group 440 of light emitting elements when the PWM signal is logically high. In other embodiments, any other type of driver capable of generating a current at a particular voltage for driving the LEDs 325 may be included in the group 440.

Each group 440 of LEDs 325 includes n distinct light emitting elements. Therefore, the backlight 260 comprises m*n total light emitting elements (e.g., LEDs 325) for generating light to be dispersed through the LCD panel 250. In addition, the arrangement of LEDs 325 associated with each group 440 may be configured to advantageously illuminate different portions (i.e., regions) of the LCD panel. For example, given the bar 320 shown in FIG. 3C and a number of LEDs equal to 30 (n=30), a first group 440 of LEDs 325 may include a first LED 325(0) through a tenth LED 325(9), a second group 440 of LEDs 325 may include an eleventh LED 325(10) through a twentieth LED 325(19), and a third group 440 of LEDs 325 may include a twenty-first LED 325(20) through a thirtieth LED 325(29). This configuration would divide the bar 320 into three distinct sections that illuminate the LCD panel 250 differently based on the physical location of the LEDs 325 in the groups 440. It will be appreciated that this type of configuration is different from one where the LEDs 325 from different groups 440 are interspersed such that each group illuminates the LCD panel 250 approximately uniformly providing a portion of the total illumination.

The PWM signal is provided to each group 440 of LEDs 325 in parallel such that all of the groups 440 are controlled at the same level. In other words, as shown in FIG. 4A, the groups 440 cannot be activated or deactivated separately or even adjusted to different levels at the same time. One technique to fix this would be to include an n-channel MOSFET transistor and pull-down resistor in series with the PWM signal between the PWM module 450 and the drivers 420 that would enable/disable each group 440 of LEDs 325 independently. When the voltage supplied to the gate of the transistor is high, the PWM signal is passed through to the driver 420 and the group 440 is activated/deactivated based on the PWM signal. Alternately, when the voltage supplied to the gate of the transistor is low, the PWM signal is blocked and the pull-down resistor deactivates the group 440. It will be appreciated that this type of system enables the groups 440 of the backlight 260 to be activated/deactivated independently; however, all groups 440 must be driven with the same PWM signal and, therefore, will generate the same level of illumination.

As shown in FIG. 4B, in another embodiment, a BLC 410 includes a separate PWM module 450 for each group 440 of LEDs 325 in the backlight 260. In other words, m PWM modules 450 generate m PWM signals distributed to m groups 440 of LEDs 325. In such an embodiment, the different PWM modules 450 may be used to activate/deactivate each group 440 of LEDs 325 independently. There is no need for enable/disable logic including the transistor/pull-down resistor described above because a group 440 of LEDs 325 may be deactivated simply by setting the duty cycle of the PWM signal for that group 440 to zero. However, the BLC 410 is more complicated than BLC 400 because the additional PWM modules 450 require additional logic or circuitry and will likely require more power.

As shown in FIG. 4C, in yet another embodiment, the BLC 400 may implement a single PWM module 450 that generates a single PWM signal that is connected to the input of a 1:m demultiplexor 470. Thus, the PWM signal can be passed to a single group 440 of LEDs 325 by configuring the demultiplexor 470 using the control signal to select a particular group 440 of the m groups 440 to activate. It will be appreciated that, in this embodiment, only a single group 440 of LEDs 325 may be activated at any particular time. The activation of multiple groups 440 may be approximated using time multiplexing techniques to activate each of multiple groups 440 successively, however, the effective illumination level of each group 440 will be a percentage of the full intensity depending on the number of groups 440 that are activated in this manner. Furthermore, in order to activate all of the groups 440 simultaneously in a normal mode of operation, some logic that enables the PWM signal to bypass the demultiplexor 470 is required.

Figure 5A:
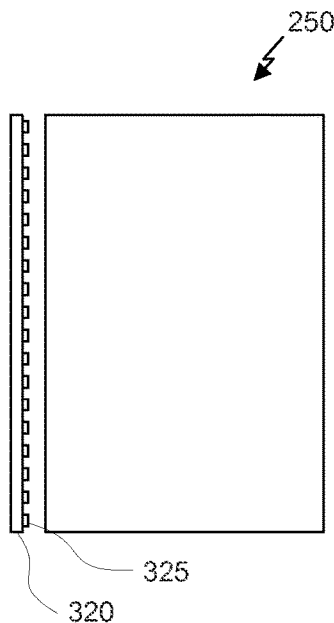
FIGS. 5A through 5D illustrate the illumination of the LCD panel, in accordance with one embodiment.
Figure 5B:
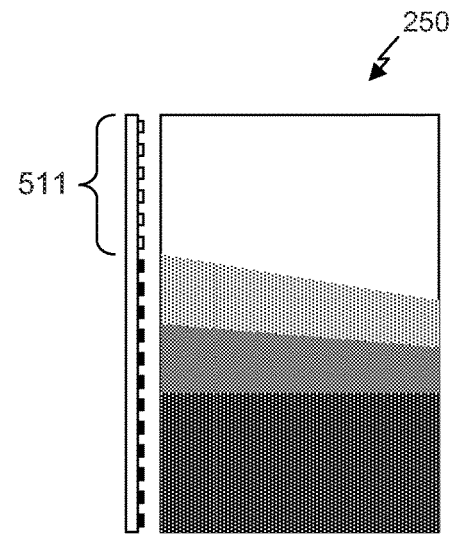
Figure 5C:
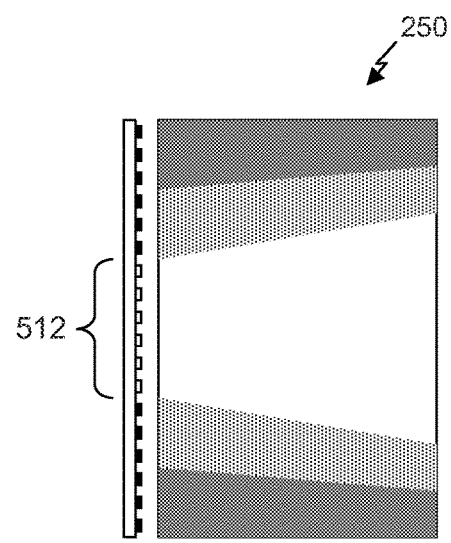
Figure 5D:
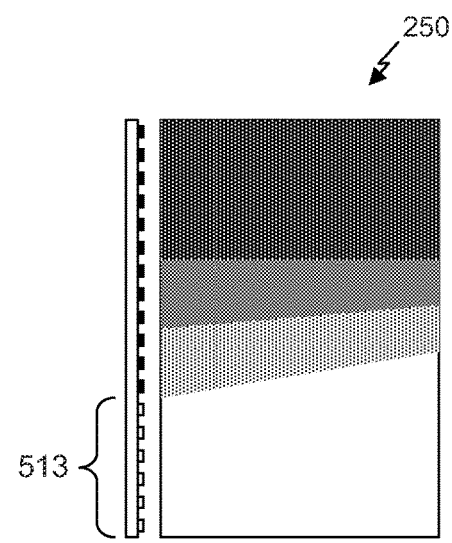

FIGS. 5A through 5D illustrate the illumination of the LCD panel 250, in accordance with one embodiment. The LCD panel 250 may be illuminated with a bar 320 of LEDs 325 positioned at a left edge of the LCD panel 250. As shown in FIGS. 5A through 5D, the bar 320 includes 18 LEDs 325 divided into three groups 440. A first group 511 of LEDs 325 includes 6 LEDs 325 along an upper portion of the LCD panel 250, a second group 512 of LEDs 325 includes 6 LEDs 325 along a middle portion of the LCD panel 250, and a third group 513 of LEDs 325 includes 6 LEDs 325 along a lower portion of the LCD panel 250. As shown in FIG. 5A, if all three groups (i.e., 511, 512, and 513) of LEDs 325 are activated, then the entire LCD panel 250 is illuminated. However, as shown in FIGS. 5B through 5D, when only one group 440 of LEDs 325 is activated, then only a portion of the LCD panel 250 is illuminated.

For example, when the first group 511 is activated, an upper portion of the LCD panel 250 is illuminated. In one embodiment, the light generated by the LEDs 325 in the first group 511 passes through a diffuser before being directed out across some of the pixels in the LCD panel 250. Because of the diffuser, there may not be a clearly delineated boundary between pixels that are fully illuminated and pixels that are not illuminated. Instead, the light that enters the diffuser is spread outwards and directed through pixels in the LCD panel 250 such that a gradient exists between pixels that are fully illuminated and pixels that are not illuminated. The gradient may represent a decreasing light intensity that is dispersed through individual pixels as those pixels are located farther away from the LEDs 325 in the first group 511 that are activated.

Similarly, when a second group 512 is activated, a middle portion of the LCD panel 250 is at least partially illuminated, and when a third group 513 is activated, a lower portion of the LCD panel 250 is at least partially illuminated. The illuminated portions associated with each subset of light emitting elements may overlap.

In another embodiment, the LEDs in a group may be driven in parallel, wherein one or more of the set of voltage and current is modulated to adjust the brightness of the LEDs. Similarly, LEDs are arranged along one or more edges of the LCD panel, and control of multiple LEDs is organized within groups such that regions of the panel may be selectively illuminated.

It will be appreciated that each liquid crystal element in the LCD panel 250 blocks light from passing through the liquid crystal element based on a voltage applied to the liquid crystal element. A low voltage may block all light from passing through the liquid crystal element while a high voltage will allow a maximum amount of light to pass through the liquid crystal element. However, if the same voltages are applied to the liquid crystal elements for two pixels located at different locations in the LCD panel 250 and the illumination from the backlight 260 dispersed through those two pixels is different at those locations, then the viewer will perceive different colors at those pixels. Colors reproduced at pixels that are not fully illuminated will look different than that same color reproduced at pixels that are fully illuminated. Consequently, images that are to be displayed on the LCD panel 250 when only one group 440 of LEDs 325 is activated should be adjusted such that the original color encoded in the image at every pixel is reproduced accurately given pixels that are not fully illuminated in at least a portion of the pixels on which the image is to be displayed.

For example, given a color represented in a 24-bit RGB color format (i.e., 8-bits per channel), each pixel in an image is assigned a red intensity value between 0-255, a green intensity value between 0-255, and a blue intensity value between 0-255. A pixel having an RGB tuple of <0, 0, 0> represents black (i.e., 0% intensity dispersed through all three liquid crystal elements), and a pixel having an RGB tuple of <255, 255, 255> represents white (i.e., 100% intensity dispersed through all three liquid crystal elements). It will be appreciated that if the light dispersed through a particular pixel is at 50% intensity when only one group 440 is activated, then the color for that pixel in an image will appear 50% less bright if that color is displayed by the pixel without any compensation. Instead, by doubling the intensity values of the RGB value in the image for that pixel, the original color encoded in the image can be reproduced by that pixel even though the illumination of that pixel is only half of the full intensity illumination. It will also be appreciated that, given the illumination level of a particular pixel in the LCD panel 250, that pixel can only reproduce an RGB color with any single channel value at a level corresponding with that illumination level. For example, if a pixel in the LCD panel 250 is illuminated at half the intensity level of other pixels in the portion of the LCD panel 250 on which the image is to be displayed, then that pixel can only properly reproduce a color in the image with an RGB tuple in the range <0 . . . 127, 0 . . . 127, 0 . . . 127>.

In one embodiment, a compensation map may be defined for each possible illumination configuration of the LCD panel 250. For example, a first compensation map may be associated with an illumination configuration having the first group 511 activated, a second compensation map may be associated with an illumination configuration having the second group 512 activated, and a third compensation map may be associated with an illumination configuration having the third group 513 activated. Each value in the compensation map may represent a scaling value to accommodate a level of illumination for a corresponding pixel in the LCD panel 250 when the LCD panel 250 is configured such that only a subset of light emitting elements are activated.

In one embodiment, a compensation map may be created by taking a digital photograph of the LCD panel with the backlight 260 configured in a particular way and each liquid crystal element in the LCD panel 250 assigned a brightest possible value (e.g., an RGB tuple of <255, 255, 255>). The digital image may sample pixel sites of an image sensor for a single channel (i.e., monochromatic) and then translate those sampled values into corresponding values of the compensation map. In one embodiment, each pixel of the LCD panel 250 is associated with a corresponding value in the compensation map. The values in the compensation map may be, e.g., floating point values that represent a scaling factor to apply to the pixel values of an image. The scaling factor may be calculated by dividing the dynamic range of the illumination (e.g., 255-0) with the sampled level of illumination for that pixel at a given illumination configuration. For example, if the sampled level of illumination is 203, then the scale factor is 255/203 or approximately 1.25.

In another embodiment, the compensation maps may be generated based on a model of the physical components of the display 220. For example, the designers know the characteristics and location of each of the light emitting elements in the display 220 and the characteristics of the diffuser and LCD panel 250 such that the amount of light that is dispersed through a particular pixel may be calculated based on a model of the system. In other embodiments, the compensation maps may be generated by sampling light intensity dispersed through the LCD panel 250 at a plurality of locations and then interpolating the sampled values to generate estimated intensity values for light dispersed through the LCD panel 250 at other pixel locations.

In one embodiment, an image may be adjusted based on the compensation map corresponding to the current illumination configuration of the LCD panel 250. The RGB tuple values for each pixel in the image may be scaled by a corresponding value in the compensation map. For example, a value in the compensation map of 1.0 represents no adjustment of the RGB tuple values in the image, while a value in the compensation map of 2.0 represents an adjustment of the RGB tuple values to be twice the original RGB tuple values in the image. In one embodiment, the adjusted RGB tuple values of the image may be outside of the dynamic range of the RGB image format. For example, doubling an RGB tuple value of 150 would generate an RGB tuple value of 300, which is above the dynamic range of the representation of pixels having an 8-bit depth. In such cases, the adjusted RGB tuple values for each pixel in the image may be normalized such that each adjusted RGB tuple value is within the dynamic range of the RGB image format. If normalization occurs, then it will be appreciated that the image reproduced by the LCD panel 250 will be darker than the original image.

In one embodiment, the processor 210 may have access to a plurality of compensation maps corresponding to different display devices from different manufacturers. For example, the processor 210 may be a GPU that is operated by a device driver executing on a host processor coupled to the GPU. The device driver may be configured to access the plurality of compensation maps from a memory accessible to the device driver. The particular set of compensation maps to use for adjusting the image may be specified by a user when configuring the system or may be automatically selected based on information received from the display 220. For example, a display 220 may provide the processor 210 with extended display identification data (EDID) which the processor 210 can parse in order to match the display 220 to a set of corresponding compensation maps stored in the memory.

FIGS. 6A through 6D illustrate an image for a user interface displayed on the LCD panel 250 under a low power configuration implemented with localized backlight control, in accordance with one embodiment. As shown in FIG. 6A, under full illumination (i.e., all groups 440 of LEDs 325 are activated), an image that is part of a user interface is displayed in a portion 610 of the LCD panel 250. The image may include an icon such as the lock indicating that a device is password protected, text, graphics, interactive text such as a clock, and other elements typically associated with a user interface displayed on an LCD panel 250. In a low power mode, where only a single group 440 of LEDs 325 is activated, an adjusted image may be displayed in a portion of the LCD panel 250. For example, as shown in FIG. 6B, when the first group 511 is activated, a top portion 611 of the LCD panel 250 may be at least partially illuminated such that the image, adjusted based on the corresponding compensation map, can be displayed on the LCD panel 250. It will be appreciated that the portion 611 of the LCD panel 250 on which the image is displayed when operating in the low power mode may be different from the portion 610 of the LCD panel 250 on which the image is displayed when the LCD panel 250 is fully illuminated.

In one embodiment, the processor 210 determines a location for the image based on the selected subset of light emitting elements to be activated. For example, the values in the compensation map represent a level of illumination for each of the pixels in the LCD panel 250 under a particular illumination configuration. The processor 210 may restrict the image from being displayed, if possible, on any pixels associated with an illumination level below a threshold value (i.e., a scale factor above a threshold value). Therefore, the processor 210 can create a binary mask that indicates which pixels in the LCD panel 250 are illuminated above a threshold value and then attempt to fit the image onto the LCD panel 250 based on the binary mask.

As shown in FIG. 6C, when the second group 512 is activated, a middle portion 612 of the LCD panel 250 may be at least partially illuminated such that the adjusted image can be displayed on the LCD panel 250. As shown in FIG. 6D, when the third group 513 is activated, a bottom portion 613 of the LCD panel 250 may be at least partially illuminated such that the adjusted image can be displayed on the LCD panel 250.

In one embodiment, the processor 210 is configured to track the operating time of each LED or groups of LEDs to ensure that the LEDs 325, or other light emitting elements, are utilized approximately equally, and to ensure that the brightness and colorimetric operating points of said light emitting elements remains consistent, and approximately equal, over the lifetime of each of the LEDs 325. The LEDs 325 and other mechanical and electrical components have a limited lifetime before a failure is expected to occur (sometimes referred to as the mean time between failures or MTBF). That lifetime may be dependent on the operation of the component. For example, an LED that is cycled more frequently than another LED may be expected to fail earlier. In another example, the brightness or colorimetric operating point of the light emitting element may vary over the lifetime of the light emitting element. The effect being that if one or more LEDs are used more often or longer than others, there may be a noticeable difference in illumination intensity or color in the region corresponding to the LED, which could induce an inconsistency or non-uniformity in the image displayed on the LCD panel. In order to ensure that the low power operation mode does not cause one set of LEDs to be overused, consequently introducing additional non-uniformity or inconsistency, and thereby shortening the lifetime of the display 220, the processor 210 may attempt to track a time that each group 440 of LEDs 325 has been activated and select different groups 440 of LEDs 325 to be activated during the low power mode of operation to more evenly activate each of the LEDs 325 over the lifetime of the display 220. Thus, the processor 210 may periodically switch the group 440 of LEDs 325 that is activated in the low power mode of operation to ensure that each group 440 of LEDs 325 has been active for approximately the same amount of time over the life of the display 220.

In one embodiment, the display 220 may include a self-refresh capability. The display 220 may implement a memory buffer for storing one or more frames of image data that can repeatedly be displayed on the screen without receiving new image data from the processor 210. In other words, the processor 210 may transmit a command to the display 220 that causes the display 220 to cache the next frame or frames of image data in the memory buffer. Once the frame(s) of image data has been transferred to the display 220, the processor 210 can go into a low power mode, such as by clock gating at least a portion of the processor 210 configured to generate the image data for display. Once the display 220 has entered a self-refresh state, the TCON 230 is configured to update the display 220 at the refresh rate based on the image data stored in the memory buffer.

In one embodiment, the processor 210 may be configured to wake-up periodically to update the image data. For example, in order to keep the time that each group 440 of LEDs 325 is illuminated relatively even, the processor 210 may be configured to wake up every p seconds and deactivate one group 440 of LEDs, activate another group 440 of LEDs 325, and update the image by adjusting the image based on a corresponding compensation map, transmit the compensated image to the display 220, and then put the display 220 back into the self-refresh state.

In another embodiment, the display remains in the self-refresh state during the update of the image and either the whole image or simply a subset of the image corresponding with the backlit region is selectively updated. It will be appreciated that sending only the selectively updated subset of the image constitutes additional power savings when compared to sending an updated version of the entire image.

In one embodiment, the display 220 is a touch-sensitive display device. When the image for the user interface is displayed on the LCD panel 250 in a low power operation mode, the touch sensitive input system may also be placed in a low power mode. For example, the frequency for sampling of touch input may be decreased. In addition, the display 220 may restrict touch input sampling to a particular portion of the screen. For example, if a lock screen image is displayed in a portion (e.g., 610, 611, 612, or 613) of the LCD panel 250, then the display 220 may be configured to only respond to touch input that is inside the extents of that portion (e.g., 610, 611, 612, or 613) of the LCD panel 250.

In yet another embodiment, a display 220 may include an aperture in the bezel 310 or frame of the display 220. For example, many Apple® Macbooks include an aperture in the shape of the Apple® logo on the back of the cover for the LCD panel 250. This aperture lights up when the backlight is turned on. Effectively, the aperture allows light from the diffuser to disperse through the back of the display 220 as well as the front of the display 220 through the LCD panel 250. In order for the aperture to remain lit during the low power mode of operation, the processor 210 may select subsets of light emitting elements that include at least one light emitting element that disperses light through the aperture. For example, if the aperture is located in the middle of the LCD panel 250, then the processor 210 may select the second group 512 of LEDs 325 such that the middle portion of the LCD panel 250 is at least partially illuminated. Alternatively, the processor 210 may be able to select multiple groups 440 of LEDs 325 such as both the first group 511 and second group 512 or the second group 512 and the third group 513 so that the image can be displayed in different locations of the LCD panel 250 and the time that each group 440 is illuminated is approximately equal over the lifetime of the display 220. In still yet another embodiment, the processor 210 may be configured to illuminate different groups 440 every refresh cycle, alternating between a first group 440 associated with a position of the image and a second group 440 associated with the aperture. By switching groups 440 every refresh cycle, it may be possible to effectively illuminate both the portion of the LCD panel 250 used to display the image and the aperture even if a single group 440 cannot illuminate both simultaneously.

Figure 7A:
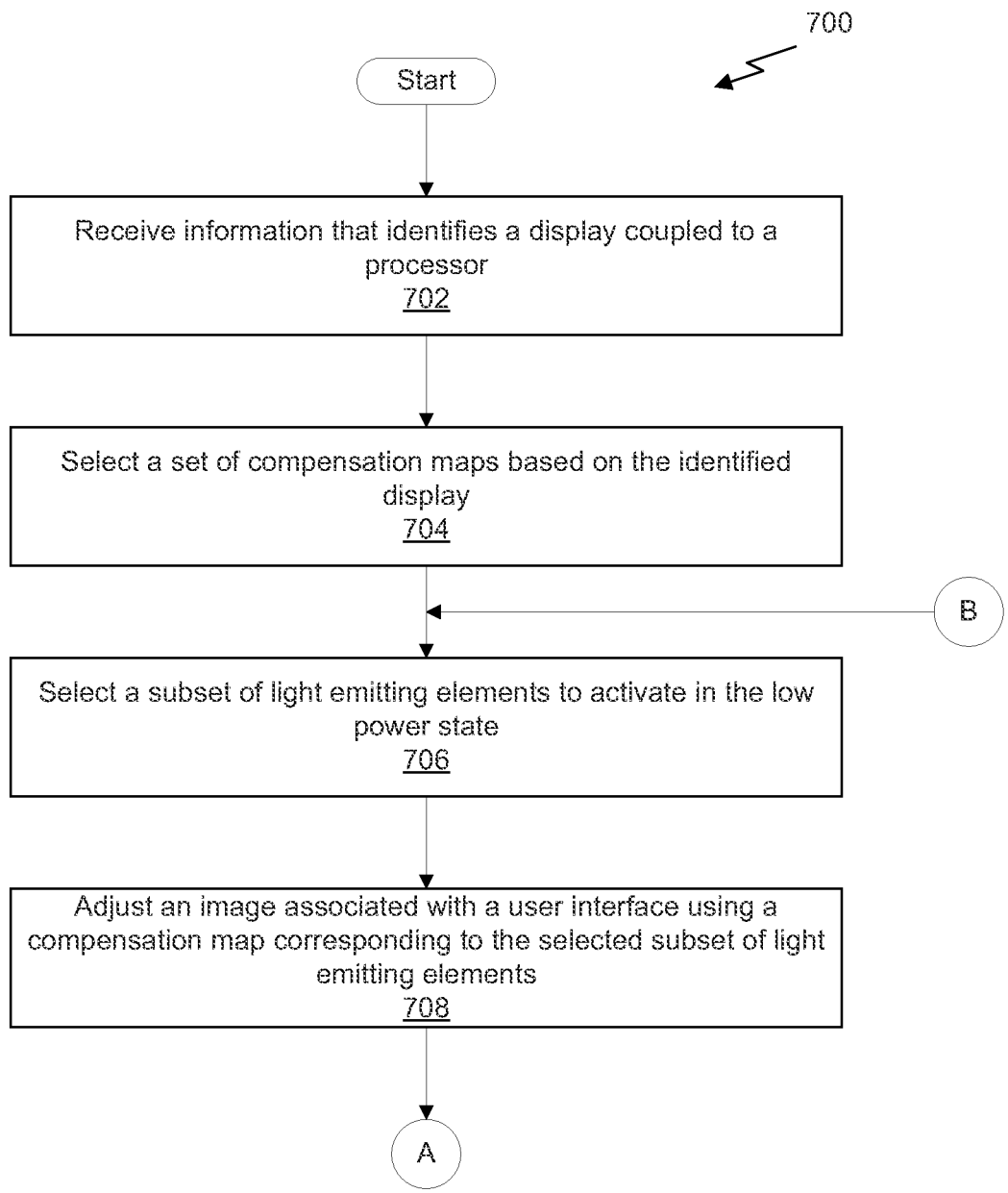
FIGS. 7A & 7B illustrate a flowchart of a method for displaying a user interface on an LCD panel running in a low power mode of operation implemented via localized backlight control, in accordance with another embodiment.
Figure 7B:
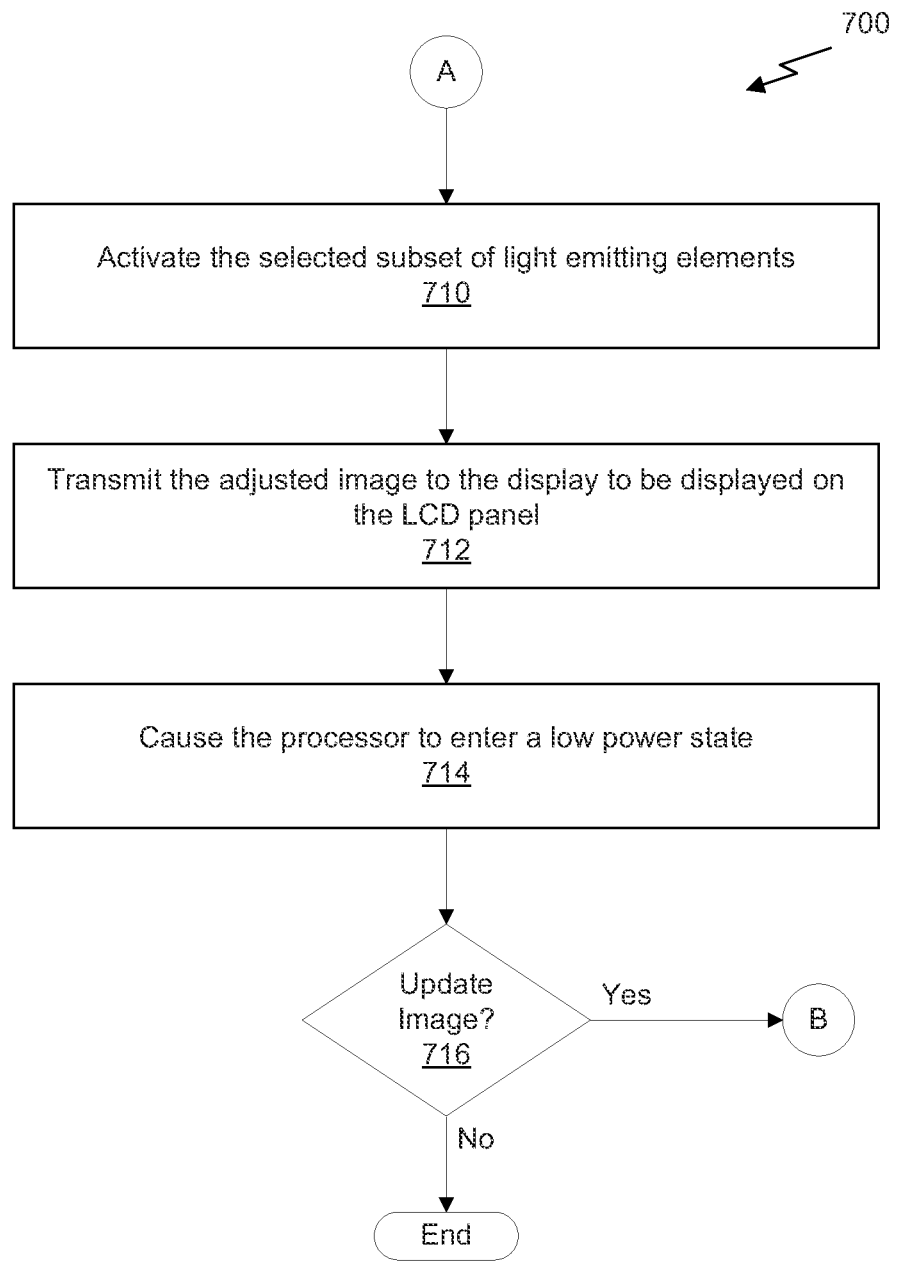

FIGS. 7A & 7B illustrate a flowchart of a method 700 for displaying a user interface on an LCD panel running in a low power mode of operation implemented via localized backlight control, in accordance with another embodiment. At step 702, the processor 210 receives information that identifies the display 220 coupled to the processor 210. The information may be read as EDID information that is stored in registers in the display 220 that are accessible via the TCON 230. At step 704, the processor 210 selects a set of compensation maps based on the identified display 220. The compensation maps are selected based on the set of maps stored in a memory that matches the EDID information. Alternately, the compensation maps may be selected manually by a user by identifying the type of display 220 connected to the processor 210.

At step 706, the processor 210 selects a subset of light emitting elements to activate. In one embodiment, the processor 210 selects a particular group 440 of LEDs 325 to activate in a low power mode. At step 708, the processor 210 adjusts an image associated with a user interface using a compensation map corresponding to the selected subset of light emitting elements. At least one pixel of the image may be adjusted (i.e., the color specified for the pixel of the image may be scaled based on a corresponding value in the compensation map).

At step 710, the processor 210 transmits a command to the display 220 to activate the selected subset of light emitting elements in the backlight 260 and deactivate any light emitting elements not included in the subset. The TCON 230 may be configured to cause the BLC 240 to activate/deactivate specific groups 440 of LEDs 325 in response to the command. At step 712, the adjusted image is transmitted to the display 220 to be displayed on the LCD panel 250. It will be appreciated that the position of the adjusted image may be changed based on the subset of light emitting elements that are activated.

At step 714, the processor 210 may enter a power saving state. In one embodiment, the processor 210 may be configured to wake-up periodically and update the display 220 by changing the selected subset of light emitting elements that are activated. At step 716, the processor 210 determines whether the image display 220 should be updated. If the display should be updated, then the method 700 returns to step 706. However, if the display 220 does not need to be updated, then the method 700 terminates.

Figure 8:
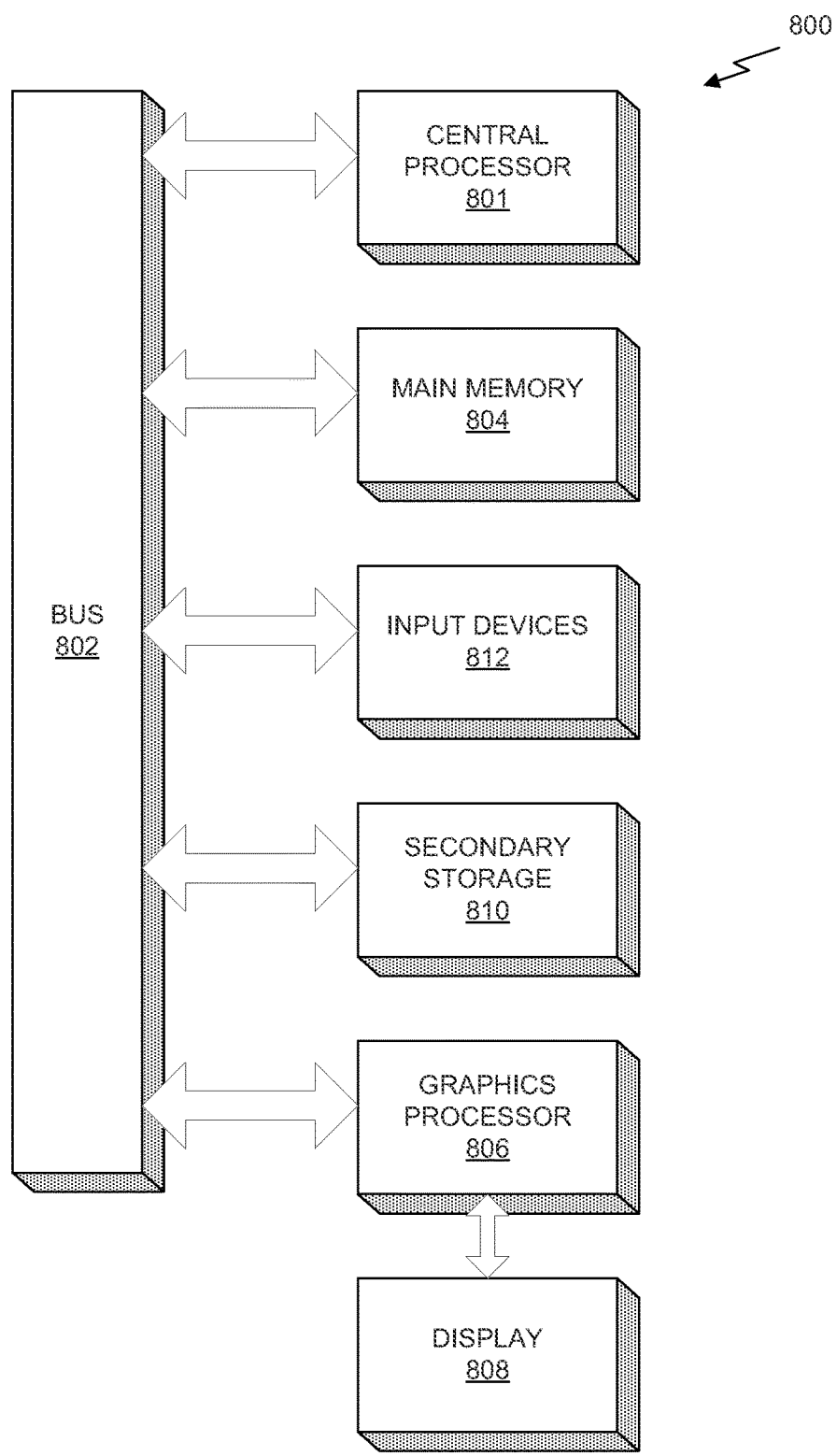
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
identifying a subset of light emitting elements included in a backlight for a liquid crystal display (LCD) panel, wherein the backlight includes a plurality of light emitting elements;
activating the subset of light emitting elements to at least partially illuminate the LCD panel while at least one light emitting element is not activated;
adjusting an image for a user interface based on a compensation map corresponding to the subset of light emitting elements, wherein the image comprises a plurality of pixel values, wherein the compensation map comprises an array of values corresponding to a particular illumination configuration of the light emitting elements in the LCD panel, and wherein adjusting the image comprises scaling each pixel value in the image by a corresponding value in the compensation map; and displaying the adjusted image on the LCD panel, wherein each value in the array of values in the compensation map represents a scaling factor to apply to a corresponding pixel in the LCD panel, and wherein the scaling factor for a particular value in the compensation map may be calculated by dividing a dynamic range of the illumination with a sampled level of illumination for the particular pixel when the subset of light emitting elements is activated.

2. The method of claim 1, wherein the backlight comprises a plurality of light emitting diodes (LEDs) and the subset of light emitting elements comprises a first group of LEDs in the plurality of LEDs.

3. The method of claim 2, wherein activating the subset of light emitting elements to partially illuminate the LCD panel while at least one light emitting element is not activated comprises activating the first group of LEDs to partially illuminate the LCD panel while a second group of LEDs is not activated.

4. The method of claim 2, wherein the plurality of LEDs are arranged in a single row on an edge of the LCD panel, and wherein no LED in a particular group of LEDs is positioned in between any other two LEDs of another group of LEDs.

5. The method of claim 1, wherein the backlight comprises two or more sheets of electroluminescent material and the subset of light emitting elements comprises a first sheet of electroluminescent material in the two or more sheets of electroluminescent material.

6. The method of claim 1, further comprising:
deactivating the subset of light emitting elements;
activating a second subset of light emitting elements to at least partially illuminate the LCD panel while at least one light emitting element is not activated;
adjusting the image based on a second compensation map associated with the second subset of light emitting elements; and
displaying the adjusted image on the LCD panel.

7. The method of claim 6, further comprising:
tracking a time that the image is displayed for a particular subset of light emitting elements;
updating the display by:
deactivating the particular subset of light emitting elements,
activating a new subset of light emitting elements,
adjusting the image based on a compensation map corresponding to the new subset of light emitting elements, and
displaying the adjusted image; and
repeating the tracking and updating for the new subset of light emitting elements.

8. The method of claim 6, wherein each subset of light emitting elements is selectively activated for an interval of time that is consistent with each of the other subsets of light emitting elements in order to minimize a difference in at least one operating characteristic between the various light emitting elements.

9. The method of claim 8, wherein a location of the image and a shape of the image are modified to match the selectively activated subset of light emitting elements.

10. The method of claim 1, wherein the compensation map comprises an inverted version of an image representing the amount of light that passes through each pixel in the LCD panel when the subset of light emitting elements is activated.

11. The method of claim 1, wherein the compensation map is generated by modeling the characteristics of the LCD panel and estimating the dispersion of light through each pixel in the LCD panel based on the model.

12. The method of claim 1, further comprising associating a plurality of compensation maps with the LCD panel, wherein each compensation map in the plurality of compensation maps corresponds to a different subset of light emitting elements.

13. The method of claim 12, further comprising selecting the plurality of compensation maps associated with the LCD panel based on extended display identification data (EDID) received from the LCD panel.

14. The method of claim 1, further comprising selecting a position on the LCD panel to display the image based on the subset of light emitting elements.

15. The method of claim 1, further comprising causing the LCD panel to enter a self-refresh state.

16. The method of claim 1, further comprising restricting touch input sensing to a portion of a surface of the LCD panel, wherein the portion of the surface corresponds to a position of the image displayed on the LCD panel.

17. The method of claim 1, wherein the subset of light emitting elements is identified in part based on a position of an aperture in a frame for the LCD panel.

18. A system comprising:
a liquid crystal display (LCD) panel;
a backlight for the LCD panel, wherein the backlight includes a plurality of light emitting elements; and
a processor coupled to the LCD panel and the backlight, the processor configured to:
identify a subset of light emitting elements included in the backlight,
activate the subset of light emitting elements to at least partially illuminate the LCD panel while at least one light emitting element in the backlight is not activated,
adjust an image for a user interface based on a compensation map corresponding to the subset of light emitting elements, wherein the image comprises a plurality of pixel values, wherein the compensation map comprises an array of values corresponding to a particular illumination configuration of the light emitting elements in the LCD panel, and wherein adjusting the image comprises scaling each pixel value in the image by a corresponding value in the compensation map, and
display the adjusted image on the LCD panel,
wherein each value in the array of values in the compensation map represents a scaling factor to apply to a corresponding pixel in the LCD panel, and
wherein the scaling factor for a particular value in the compensation map may be calculated by dividing a dynamic range of the illumination with a sampled level of illumination for the particular pixel when the subset of light emitting elements is activated.

19. The system of claim 18, wherein the backlight comprises a plurality of light emitting diodes (LEDs) and the subset of light emitting elements comprises a first group of LEDs in the plurality of LEDs.

20. The system of claim 18, wherein the processor is further configured to:
deactivate the subset of light emitting elements;

activate a second subset of light emitting elements to at least partially illuminate the LCD panel while at least one light emitting element is not activated;
adjust the image based on a second compensation map corresponding to the second subset of light emitting elements; and
display the adjusted image on the LCD panel.

* * * * *